UNITED STATES PATENT OFFICE.

AUGUST LEOPOLD LASKA AND ARTHUR ZITSCHER, OF OFFENBACH-ON-THE-MAIN, GERMANY, ASSIGNORS TO THE CORPORATION OF CHEMISCHE FABRIK GRIESHEIM-ELEKTRON, OF FRANKFORT-ON-THE-MAIN, GERMANY.

DISAZO DYESTUFF.

1,091,148.   Specification of Letters Patent.   Patented Mar. 24, 1914.

No Drawing.   Application filed August 26, 1913.   Serial No. 786,654.

*To all whom it may concern:*

Be it known that we, AUGUST LEOPOLD LASKA and ARTHUR ZITSCHER, both doctors of philosophy and chemists and citizens of the German Empire, and residents of Offenbach-on-the-Main, in the Grand Duchy of Hesse, Germany, with the post-office addresses Wilhelmsplatz 18 and Friedrichstrasse 31, respectively, have invented new and useful Improvements in Disazo Dyestuffs, of which the following is a specification.

Our invention relates to the production of new disazo dyestuffs, which may be obtained by combining the tetrazo compound of tetrachlorobenzidin $$(NH_2:Cl:Cl=1:2:5)$$

with two molecular proportions of a 1-aryl-3-methyl-5-pyrozolone. These dyestuffs, having probably the formula:

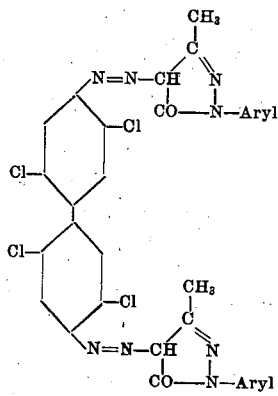

yield color lakes, which are completely insoluble in oil and are distinguished from the lakes of the dyestuffs, described in the specification of Patent No. 1,001,286, by their greater greenness of shade.

In order to illustrate the new process more fully, the following example is given, the parts being by weight: 32.2 parts of tetrachlorobenzidin $$(NH_2:Cl:Cl=1:2:5)$$

are mixed with 91 parts of hydrochloric acid of 20° Bé. and 150 parts of water and diazotized by addition of 14 parts of sodium nitrite. Into this tetrazo solution filtered, if necessary, is poured a solution, cooled with ice, of 49 parts of 1-(2:5)-dichlorophenyl-3-methyl-5-pyrazolone in 56 parts of caustic soda lye of 35° Bé. and 400 parts of water while well stirring. The dyestuff separates in the form of yellow flakes, it is filtered when the combination is complete and washed neutral. It forms, when dry, an intensively yellow powder, soluble in concentrated sulfuric acid to an orange solution. For the preparation of lakes the dyestuff is preferably used in the form of a paste. It yields greenish yellow pigment colors, insoluble in water and oil and particularly fast to light. This dyestuff has probably the following formula:

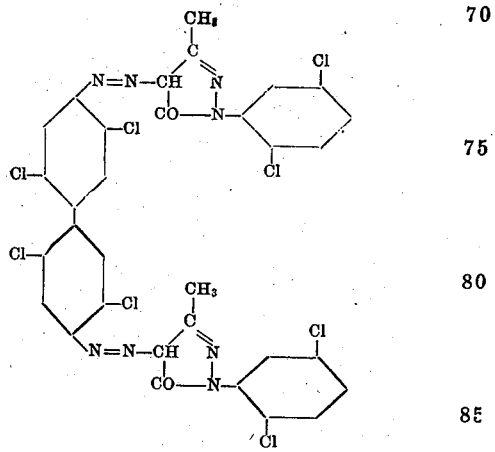

The formation of dyestuffs with other 1-aryl-3-methyl-5-pyrazolones may be carried out in the same manner.

Now what we claim and desire to secure by Letters Patent is the following:

1. The process of making disazo dyestuffs especially suitable for the preparation of pigment colors consisting in combining the tetrazo compound of tetrachlorobenzidin $$(NH_2:Cl:Cl=1:2:5)$$

with two molecular proportions of a 1-aryl-3-methyl-5-pyrazolone.

2. As new articles the dyestuffs, having probably the formula:

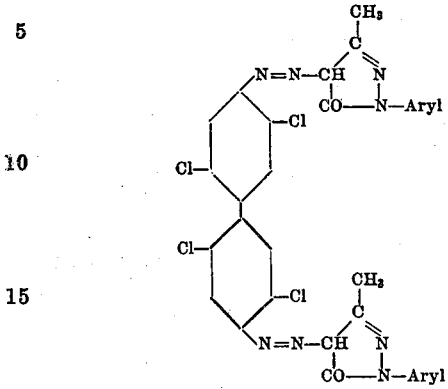

which form, when dry, yellow powders, soluble in concentrated sulfuric acid to an orange solution and giving yellow pigment colors, which are insoluble in oil and water and particularly fast to light.

3. The process of making a disazo dyestuff especially suitable for the preparation of pigment colors consisting in combining the tetrazo compound of tetrachlorobenzidin $$(NH_2:Cl:Cl=1:2:5)$$

with two molecular proportions of the 1-(2:5)-dichlorophenyl-3-methyl-5-pyrazolone.

4. As a new article the dyestuff, having probably the formula:

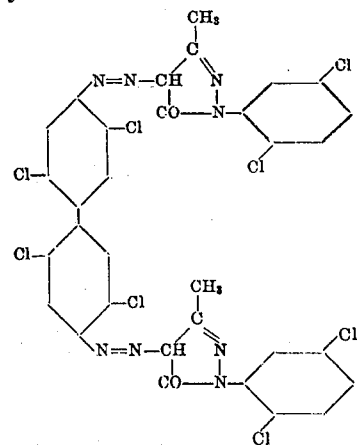

which forms, when dry, an intensively yellow powder, soluble in concentrated sulfuric acid to an orange solution, and gives greenish yellow pigment colors which are insoluble in oil and water and particularly fast to light.

In testimony, that we claim the foregoing as our invention, we have signed our names in presence of two witnesses, this thirteenth day of August 1913.

AUGUST LEOPOLD LASKA.
ARTHUR ZITSCHER.

Witnesses:
PETER LAUTENSCHLÄGER,
FRITZ DÉSOR.